United States Patent

[11] 3,597,857

[72] Inventors William Desmond Akister
 Aylesbury;
 Meville Leslie Shelley, Haywards Heath,
 both of, England
[21] Appl. No. 795,946
[22] Filed Feb. 3, 1969
[45] Patented Aug. 10, 1971
[73] Assignee Redifon Limited
 London, England
[32] Priority Mar. 4, 1968
[33] Great Britain
[31] 10279/68

[54] GROUND BASED FLIGHT SIMULATING APPARATUS
 13 Claims, 3 Drawing Figs.
[52] U.S. Cl................................................. 35/12
[51] Int. Cl................................................. G09b 9/08, B64g 7/00
[50] Field of Search...................................... 35/12

[56] References Cited
UNITED STATES PATENTS
3,295,224 1/1967 Cappel.................... 35/12
3,304,628 2/1967 Kaplan.................... 35/12

Primary Examiner—Robert W. Michell
Assistant Examiner—L. R. Oremland
Attorney—Larson, Taylor and Hinds ABSTRACT: In ground-based flight-simulating apparatus, a dummy flight deck is provided for the crew being trained and the dummy flight deck, with occupants, is moved to simulate at least pitch and roll movement of an aircraft in actual flight. The present invention comprises a dummy flight deck suspended from a supporting structure by three hydraulic jacks attached to the dummy flight deck. Differential action of the jacks provides pitch and bank motions and common action provides heave motion. A further pair of hydraulic jacks attached, on opposite sides of the flight deck centerline, provides yaw, surge and retardation motions. A further hydraulic jack, acting transversely of the flight deck centerline, provides sway motion.

GROUND BASED FLIGHT SIMULATING APPARATUS

This invention relates to ground-based aircraft flight simulators in which movement of the flight deck of an aircraft is simulated in response to the operation of the flying controls.

Flight-training apparatus is known in which a dummy flight deck is given angular movement around its pitch and roll axes, in order to simulate the corresponding motion of an aircraft in actual flight. Such an apparatus is described in British Pat. No. 749,048.

Unlike an aircraft in actual flight, however, a dummy flight deck can be permitted only limited displacement or angular movement. Thus, means have been proposed for restoring the dummy flight deck slowly to a reference position, after flight simulated movement, so that such return is imperceptible to the occupants.

In modern aircraft, a considerable amount of physical disturbance is experienced by the crew when rapid changes of height or of direction are made at high speed. Such changes may result from maneuvers, effected by the pilot or by the autopilot, or may be caused by atmospheric turbulence. Consequently, a great deal of practice is required to operate successfully many of the automatic and semiautomatic devices installed in such aircraft. It may be difficult or dangerous, under actual flying conditions, to determine whether the crew are able to operate such devices satisfactorily. Training of crew in flight simulating apparatus thus provides a preferably alternative to training in actual flying operations.

It is an object of the present invention to provide ground-based apparatus in which a dummy flight deck of an aircraft is controlled to move along and around several axes, so that the physical effects experienced by the crew of a high-speed aircraft are more realistically represented than heretofore.

Accordingly, the present invention provides a ground-based aircraft flight simulator including a dummy flight deck of an aircraft mounted for simulated movement, including simulated movement about longitudinal and transverse axes thereof, having a plurality of extensible and retractable drive members operable for providing said simulated movement, first and second of said drive members being attached to the dummy flight deck at points spaced apart on opposite sides of the longitudinal axis thereof and being operable for up and down movement of said attachment points, a third one of said drive members being attached to the dummy flight deck at a point on the opposite side of the transverse axis from said first and second drive members and being operable for up and down movement of its said attachment point, a fourth one of said drive members being attached to the dummy flight deck at a point laterally spaced from the longitudinal axis thereof and being operable for lateral movement of its said attachment point in a fore and aft direction relative to said longitudinal axis, and a fifth one of said drive members being attached to the dummy flight deck and being operable for lateral movement of its said attachment point in a direction transverse of the longitudinal axis of the dummy flight deck.

If so desired, each of the first, second and third drive members may be duplicated, by a correspondingly attached support or suspension extensible drive member respectively so as to provide both suspension from above and support from below for the dummy flight deck. Similarly, the two drive members, attached forward or aft, may each be duplicated by a correspondingly attached extensible drive member which is also attached to a point located aft or forward, respectively, of the dummy flight deck. Similarly, the single drive member which is attached also at one side of the dummy flight deck may be duplicated by a correspondingly attached extensible drive member which is also attached to a point located on the opposite side of the dummy flight deck.

Preferably, however, the dummy flight deck is solely suspended from above by three drive members.

Preferably, the attachment points of the three suspension drive members define an isosceles triangle, for example an equilateral triangle. Preferably, the two drive members, which are attached to the dummy flight deck at opposite sides thereof, are mounted parallel to each other and parallel to the longitudinal axis of the dummy flight deck, in the rest position thereof. Preferably, the drive member, for providing sway motion, is mounted horizontally and at right angles to the longitudinal axis of the dummy flight deck, in the reset position thereof.

Thus, it will be seen, that an arrangement according to the invention is capable of providing motion of the dummy flight deck about six axes, thereby facilitating simulated motion in all six degrees of freedom of an actual aircraft.

In order that the invention may be readily carried into effect, one embodiment thereof will now be described in detail, by way of example, with reference to the accompanying drawings, in which.

Figure 1:
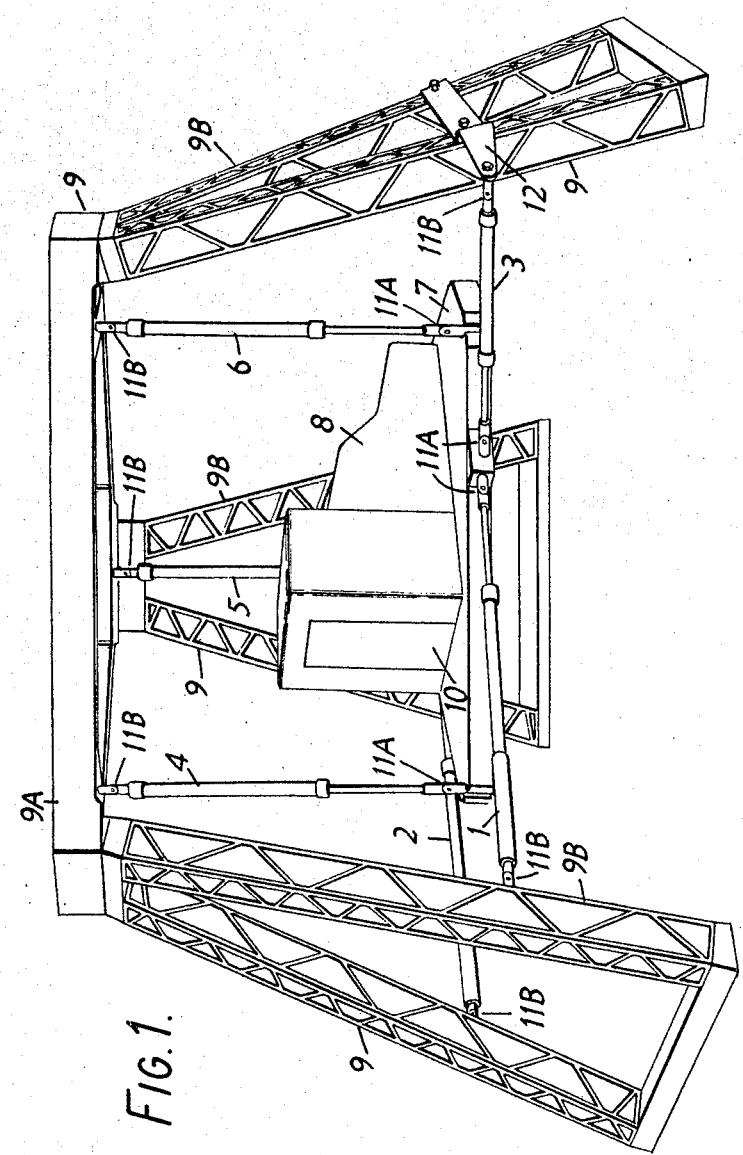
FIG. 1 is a perspective view, from one side, of a dummy flight deck suspension arrangement for a ground-based aircraft flight simulator according to the invention.

In the apparatus of FIG. 1, a substantially triangular base platform 7 carries a dummy flight deck 8 having an entrance 10 for trainee personnel.

The platform 7 is suspended by three extensible drive members 4, 5 and 6, which in this embodiment are hydraulic jacks which are extensible from about 12 feet to about 20 feet in length. The three jacks 4, 5 and 6 are attached by universal joints 11A to the base 7 near the apices thereof, which apices rounded off, or otherwise cut back as shown in FIG. 1. The three jacks 4, 5 and 6 are disposed substantially vertically and suspended from a supporting frame 9 by universal joints 11B.

The supporting frame 9 is of openwork girder construction and comprises essentially an elevated gantry 9A, of triangular form with the apices cut back, supported at each cutback apex by a support frame 9B comprising two legs and a horizontal base member.

Two fore and aft hydraulic jacks 1 and 2 are attached by universal joints 11B, one jack to each leg of the support frame 9B. The other ends of the jacks 1 and 2 are attached by universal joints 11A to the base frame 7. The two jacks 1 and 2 are arranged substantially horizontally, in the position of midextension of the jacks 4, 5, and 6, as shown in FIG. 1. The two jacks 1 and 2 are arranged parallel to each other and the points of attachment 11A to the base frame 7 define a line parallel to the attachment points of the jacks 5 and 6 midway between the attachment point of jack 4 and the said attachment points of jacks 5 and 6.

A single side jack 3 is also arranged substantially horizontally in the position shown in FIG. 1, attached to the base frame 7 by a universal joint 11A and, by a universal joint 11B, to a transverse extension 12, itself attached to the support frame 9B. The axis of the jack 3 passes substantially through the center of gravity of the base frame 7, lies in a lane to which the axes of the jacks 4, 5 and 6 are perpendicular and is perpendicular to the axes of the jacks 1 and 2.

The central axis of the dummy flight deck 8 passes through the point of attachment of jack 4 and intersects the line joining the points of attachment of jacks 5 and 6. Jack 4 is therefore the rear suspension jack and jacks 5 and 6 the front left and front right suspension jacks respectively, relatively to the flight deck 8.

Figure 2:
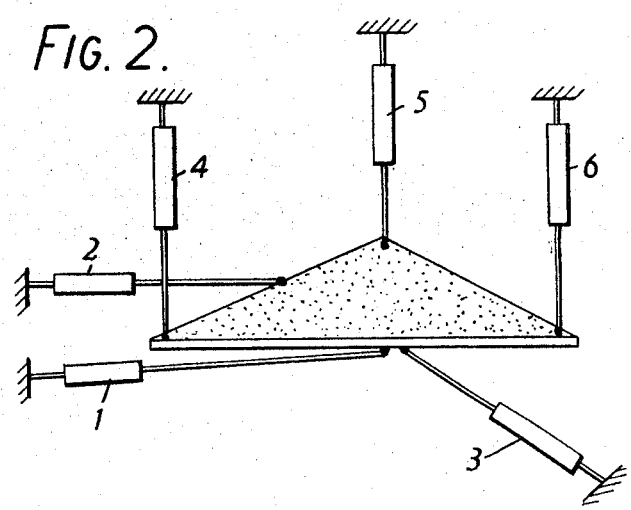
FIG. 2 is a diagram showing the suspension and movement drive member arrangement of the apparatus of FIG. 1.

Operation of the structure may be seen from FIG. 1 or the simplified diagram of FIG. 2 and is as follows: Extension or contraction of all of jacks 4, 5 and 6 simultaneously, provides downwards heave or upwards heave, respectively. Differential action of jack 4 and jacks 5 and 6 together, provides pitch. Differential action of jacks 5 and 6, without movement of jack 4, provides roll.

Simultaneous extension or contraction of the fore and aft jacks 1 and 2, provides surge or retardation, respectively. Differential operation of jacks 1 and 2, provides yaw.

Extension or contraction of jack 3, provides sway to the left or right, respectively.

It may here be noted that a usable system still remains without providing all of the six jacks 1 to 6, described above. Thus, for simplicity or economy, or in the event of damage or malfunctioning of any jack or its associated control system, some of the jacks and some combinations of the jacks may be replaced by rigid struts.

Thus, if the side jack 3 is replaced by a rigid strut, a five-axis motion system remains, without provision of sway. If the fore-and-aft jacks 1 and 2 are replaced by rigid struts, a four-axis motion system remains, without provision of surge or retardation and yaw. Replacement of both the fore and aft jacks 1 and 2 and the side jack 3 provides a three-axis motion system providing heave, pitch and roll, only.

Figure 3:
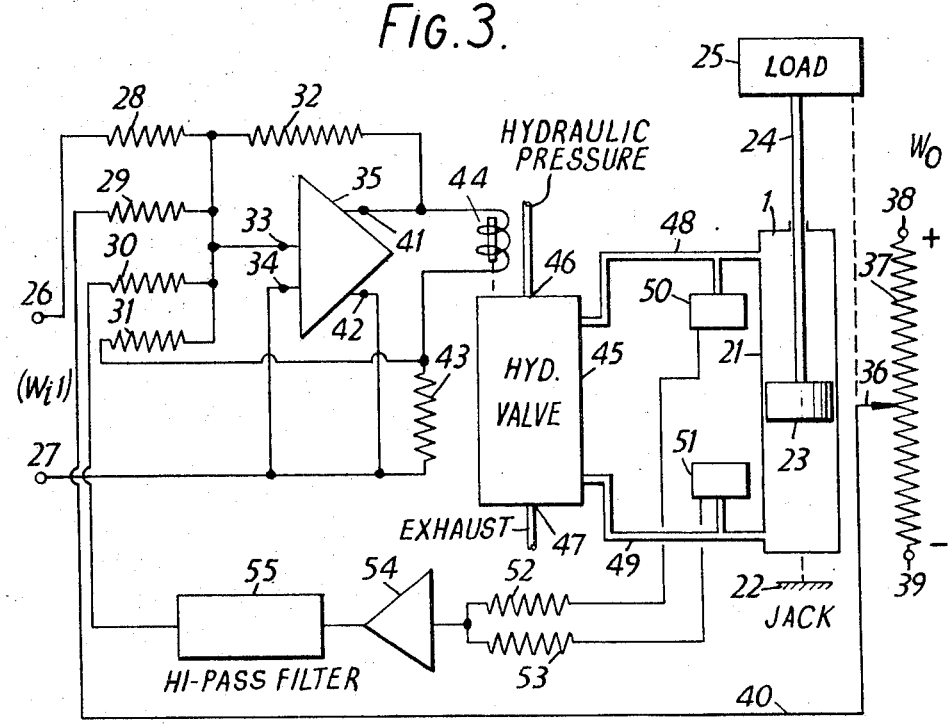
FIG. 3 is a schematic circuit diagram of the control arrangement for a representative drive member.

The servocontrol system of FIG. 3 functions to actuate a jack 1 having a cylinder 21, attached to a mounting at 22, and a piston 23 connected by rod 24 to a movable load 25.

An input demand signal, designated Wi1, is applied between input terminals 26 and 27. Terminal 26 is connected to a series resistor 28, for scaling the said input demand signal. The resister 28 forms one of four input resistors 28, 29, 30 and 31, all series connected to one input terminal 33 of a servoamplifier. Input terminal 27 is connected to the input terminal 34 of the servoamplifier 35.

Output displacement of the load 25, by operation of the jack 1, produces corresponding movement of the slider 36 of an answer potentiometer 37, having its outer terminals 38 and 39 connected to a source of positive and negative potential, respectively. The slider 36 is connected by line 40 and by way of series resistor 29 to the input 33 of the servoamplifier 35. Resistor 29 serves to scale the feedback signal from the answer potentiometer 37.

Series resistor 30 serves to damp load resonance and series resistor 31 controls a feedback signal, as is fully described later herein.

The summed signal by way of resistors 28 and 31 is applied to the input of servoamplifier 35. The output of amplifier 35 appears at terminals 41 and 42 and is fed, by way of series resistor 43 to a hydraulic valve control solenoid 44. Resistor 43 provides current feedback to raise the output impedance of servoamplifier 35. The junction of resistor 43 with solenoid 44, is connected by way of series resistor 31, which scales the feedback current signal, to the input of servoamplifier 35.

Output terminal 41 of servoamplifier 35 is connected by way of a resistor 32, which sets the amplifier gain, in a feedback path to the input terminal 33.

Solenoid 44 actuates a hydraulic control valve 45, having an input pressure port 46 and an exhaust port 47. The valve 45 supplies hydraulic fluid, by lines 48 and 49, to the cylinder 21 portions on the two sides of the piston 23.

Connected into hydraulic lines 48 and 49 are pressure transducers 50 and 51, respectively. The output signals of pressure transducers 50 and 51 are respectively supplied by way of summing resistors 52 and 53 to the input of a summing amplifier 54. The output of amplifier 54 is supplied, by way of a high pass filter 55 and series resistor 30, which as stated serves to damp the effect of load 25 resonance, to the input 33 of servoamplifier 35.

A servocontrol system, similar to that described with reference to FIG. 3, is provided for each one of the jacks 1 to 6 of the apparatus of FIG. 1.

A mathematical analysis of the input signals supplied to the servocontrol systems of jacks 1 to 6 is unnecessary for a clear understanding of the mechanical operation of the apparatus of FIG. 1. Nevertheless to provide a full understanding of the operation of the system in conjunction with a flight simulator computer, such analysis is given below.

The input signals fed into the servocontrol systems of FIG. 3, associated with the hydraulic jacks 1 to 6 of FIG. 1, may be defined by the following equations:

Jack    Equation
1. $Wi1 = K1\dot{x} + K8 - K4\dot{\psi}$
2. $Wi2 = K1\dot{x} - K8 + K4\dot{\psi}$
3. $Wi3 = -K2\dot{y}$
4. $Wi4 = K3\dot{Z} + \frac{K5\theta}{2} + \frac{K7\theta}{2}$
5. $Wi5 = K3\dot{Z} - \frac{K5\theta}{2} - \frac{K7\theta}{2} - K6\dot{\phi}$
6. $Wi6 = K3\dot{Z} - \frac{K5\theta}{2} - \frac{K7\theta}{2} + K6\dot{\phi}$ The input quantities $Wi1$ to $Wi6$ are computed in the flight dynamics computer of an associated flight simulator and are limited to values such that maximum permissible jack displacements are not exceeded.

In the equations for $Wi1$ to $Wi6$:

K1 to K7 are constants related to the geometry of the motion platform and the time constants of the motion platform response.
K8    is a constant offsetting displacements due to airspeed.
$\dot{x}$    is the computed longitudinal velocity of the pilot.
$\dot{y}$    is the computed vertical velocity of the pilot.
$\dot{z}$    is the computed vertical velocity of the pilot.
$\dot{\theta}$    is the computed pitch rate of the simulated aircraft.
$\dot{\phi}$    is the computed roll rate of the simulated aircraft.
$\dot{\psi}$    is the computed yaw rate of the simulated aircraft.
$\theta$    is the computed pitch angle of the simulated aircraft.

All the last seven values above are computed variables, including effects of winds and turbulence.

The input quantities $Wi1$ to $Wi6$ assume a servojack response which is given by the Laplace transform:

$$\mathcal{L}\frac{Wo}{Wi} = \frac{i}{1+ST} = Y$$

where
$y$ = transfer function
$Wo$ = servo jack response to input $Wi$
$Wi$ = servo jack input demand
$S$ = Laplace operator
$T$ = time constant. If the transfer function has higher order terms of $S$ in the denominator, then higher derivatives of the computed variables must also be fed into the servoamplifiers. However, the input quantities $Wi1$ to $Wi6$ are sufficient for most practical purposes.

The effect of the summed inputs on the individual axes are therefore as follows:

Heave—Moves as simulated aircraft minus effect of steady vertical velocity achieved;
Sway—Moves as simulated aircraft minus effect of steady velocity sideways;
Surge—Moves as simulated aircraft minus effect of steady speed forwards;
Pitch—Moves as simulated aircraft pitch angle;
Roll—Moves as simulated aircraft minus effect of steady roll rate; and
Yaw—Moves as aircraft minus effect of steady yaw rate.

An alternative embodiment of the invention has the dummy flight deck 8 solely suspended from above by the three jacks, but differs from the embodiment described with reference to FIGS. 1 and 2 in that the sway jack 3 is duplicated by a second similar jack on the opposite side of platform 7, both jacks acting through the same point in the body of the platform, but the pair of jacks 1 and 2 are replaced by a single jack providing yaw motion.

We claim:

1. A motion simulator for a ground-based flight simulator having a platform for supporting a dummy flight deck, said platform defining longitudinal and transverse axes and having three support points, first and second of said support points being located on opposite sides of the longitudinal axis from each other and the third support point being located on the opposite side of the transverse axis from said first and second points, a gantry including a support structure located above said platform and having three attachment points defining a triangle, first, second and third controllable extensible and retractable drive members connected respectively between said first, second and third platform support points and said three gantry attachment points, for suspending said platform from said gantry, said first, second and third platform supports being pivotally connected to said gantry and said platform, fourth and fifth controllable extensible and retractable drive members attached to said platform on opposite sides of said longitudinal axis whereby differential operation of said fourth and fifth drive members provides skewing of said platform longitudinal axis and a sixth controllable extensible and retractible member attached to said platform for providing lateral displacement of said platform longitudinal axis.

2. A motion simulator as claimed in claim 1, in which said fourth and fifth drive members are attached to said platform at points between the said third drive member and said first and second drive members.

3. A motion simulator as claimed in claim 2, in which said fourth and fifth drive members are arranged with axes parallel under conditions of equal extension and both extend from the said platform attachment points in the same direction relatively to the platform longitudinal axis.

4. A motion simulator as claimed in claim 3, in which the platform part between the said platform attachment points of the fourth and fifth drive members and the third drive member is tapered in the direction of said third drive member.

5. A motion simulator as claimed in claim 1, in which said sixth drive member is attached to the said platform at a point between said third drive member and one of said first and second drive members.

6. A motion simulator as claimed in claim 5, in which the said platform is of substantially equilateral triangular form, between the said support points, and the said gantry support structure is of substantially equilateral triangular form, between the said attachment points.

7. A motion simulator as claimed in claim 1, in which the gantry is of tripod construction.

8. A motion simulator as claimed in claim 7, in which the tripod feet of said gantry are each of triangular frame construction and attached to said support structure at the apex of said frame.

9. A ground-based aircraft flight simulator as claimed in claim 1, in which the said first, second and third of said drive members extend downwardly from fixed attachment points on the said gantry to their said attachment points on the dummy flight deck and support and move the dummy flight deck from above.

10. A ground-based aircraft flight simulator as claimed in claim 9, including a support gantry and having first, second and third pairs of said drive members, the drive members of each pair extending upwardly from fixed points to their attachment points on the dummy flight deck and extending downwardly from fixed attachments on the said gantry to their said attachment points on the dummy flight deck, respectively.

11. A ground-based aircraft flight simulator as claimed in claim 9, having a pair of said drive members including said fifth one of said drive members, the other drive member of said pair being similarly attached to the dummy flight deck and operable for lateral movement of its attachment point in the same said transverse direction.

12. A ground-based aircraft flight simulator as claimed in claim 9, having a pair of said drive members including said fourth one of said drive members, the other drive member of said pair being attached go the dummy flight deck at a point laterally spaced from the longitudinal axis thereof and on the opposite side thereof from that of said fourth one of said drive member, whereby differential operation of said pair of drive members provides skewing of said longitudinal axis of the dummy flight deck.

13. A ground-based aircraft flight simulator as claimed in claim 12, in which both drive members of said pair, which includes said fourth one of said drive members, themselves form one drive member of a pair, both drive members of each said pair having the same point of attachment as each other to the dummy flight deck, the two drive members of each said pair extending in opposite fore-and-aft directions therefrom.